(No Model.) 4 Sheets—Sheet 1.

R. W. RENARD.
HAY RAKE AND LOADER.

No. 412,294. Patented Oct. 8, 1889.

WITNESSES
Edwin L. Yewell
Hamilton Catlin.

INVENTOR
R. W. Renard
by Robt H Read
his Attorney (No Model.) 4 Sheets—Sheet 3.

R. W. RENARD.
HAY RAKE AND LOADER.

No. 412,294. Patented Oct. 8, 1889.

WITNESSES
Edwin T. Yewell
Hamilton Catlin

INVENTOR
R. W. Renard
by Rose H. Head
his Attorney (No Model.) 4 Sheets—Sheet 4.
R. W. RENARD.
HAY RAKE AND LOADER.
No. 412,294. Patented Oct. 8, 1889.
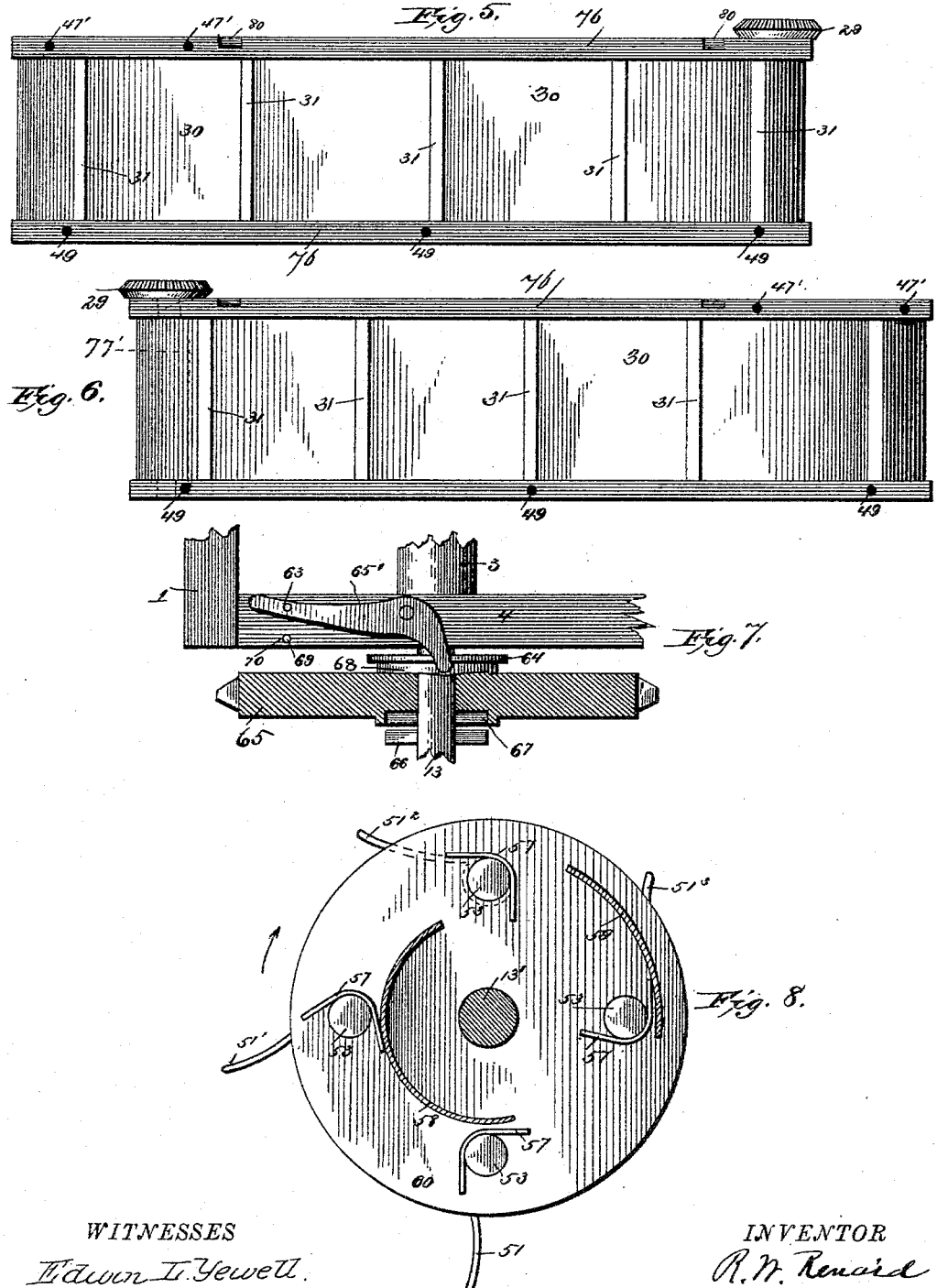
WITNESSES
Edwin I. Yewell.
Hamilton Catlin.
INVENTOR
R. W. Renard
by Ross H. Head
his Attorney

UNITED STATES PATENT OFFICE.

RUDOLPH W. RENARD, OF HOGESTOWN, PENNSYLVANIA.

HAY RAKE AND LOADER.

SPECIFICATION forming part of Letters Patent No. 412,294, dated October 8, 1889.

Application filed May 3, 1888. Serial No. 272,670. (No model.)

*To all whom it may concern:*

Be it known that I, RUDOLPH W. RENARD, a citizen of the United States, residing at Hogestown, in the county of Cumberland and State of Pennsylvania, have invented certain new and useful Improvements in Hay Rakes and Loaders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to hay raking and loading apparatus, and has for its object the production of a machine which will handle the hay with facility and a small force of workmen, and which may be used for tedding or loading at will; to deliver the hay to a wagon at either side of the loader and at the point desired by the builder; to build a load of any desired height upon the wagon; to make the parts readily controllable and the entire machine of such weight that it can be drawn by a single horse.

The invention embodies structural features which will hereinafter be clearly set forth in the specification, and then definitely indicated in the appended claims.

Figure 1:
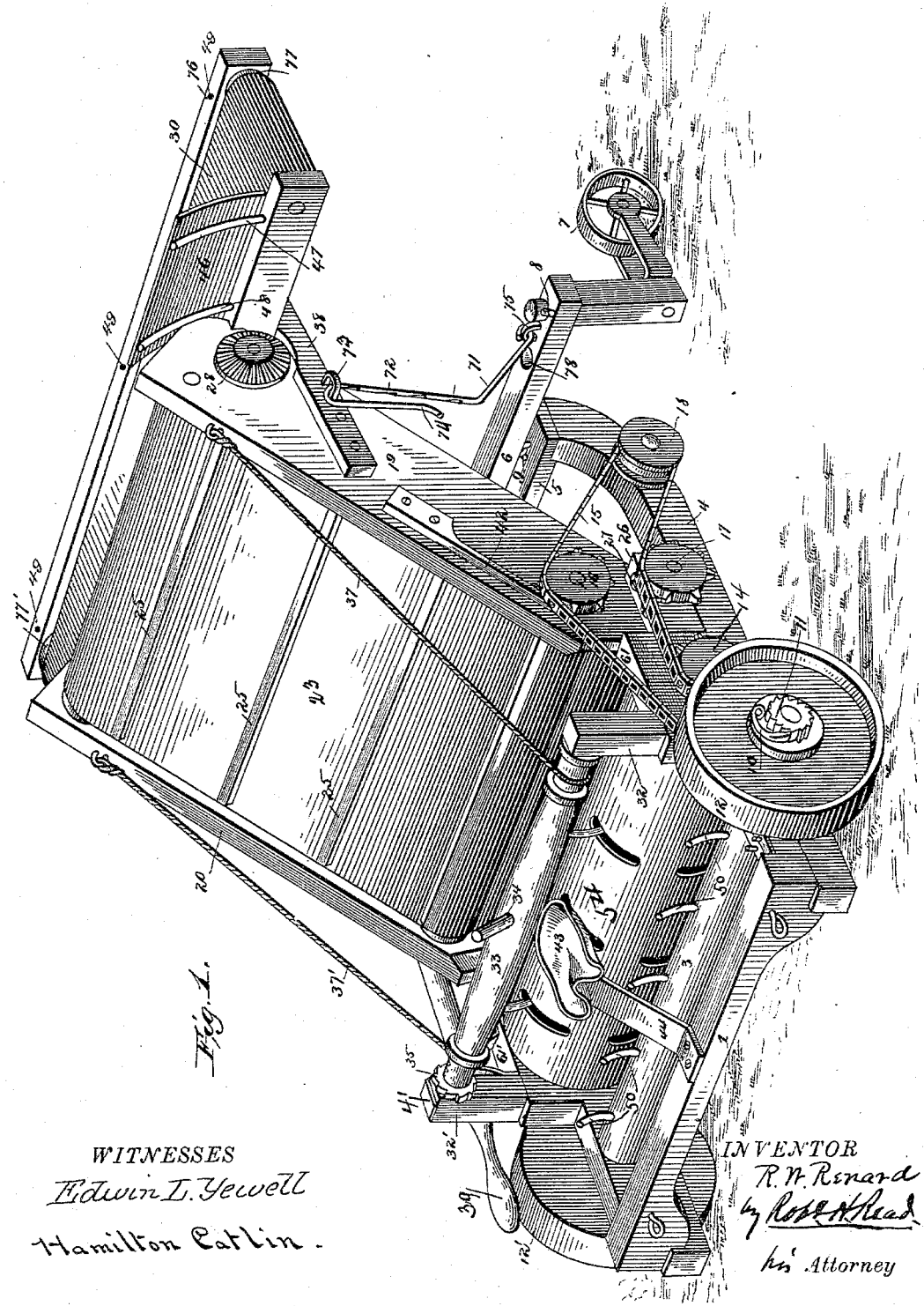
Figure 2:
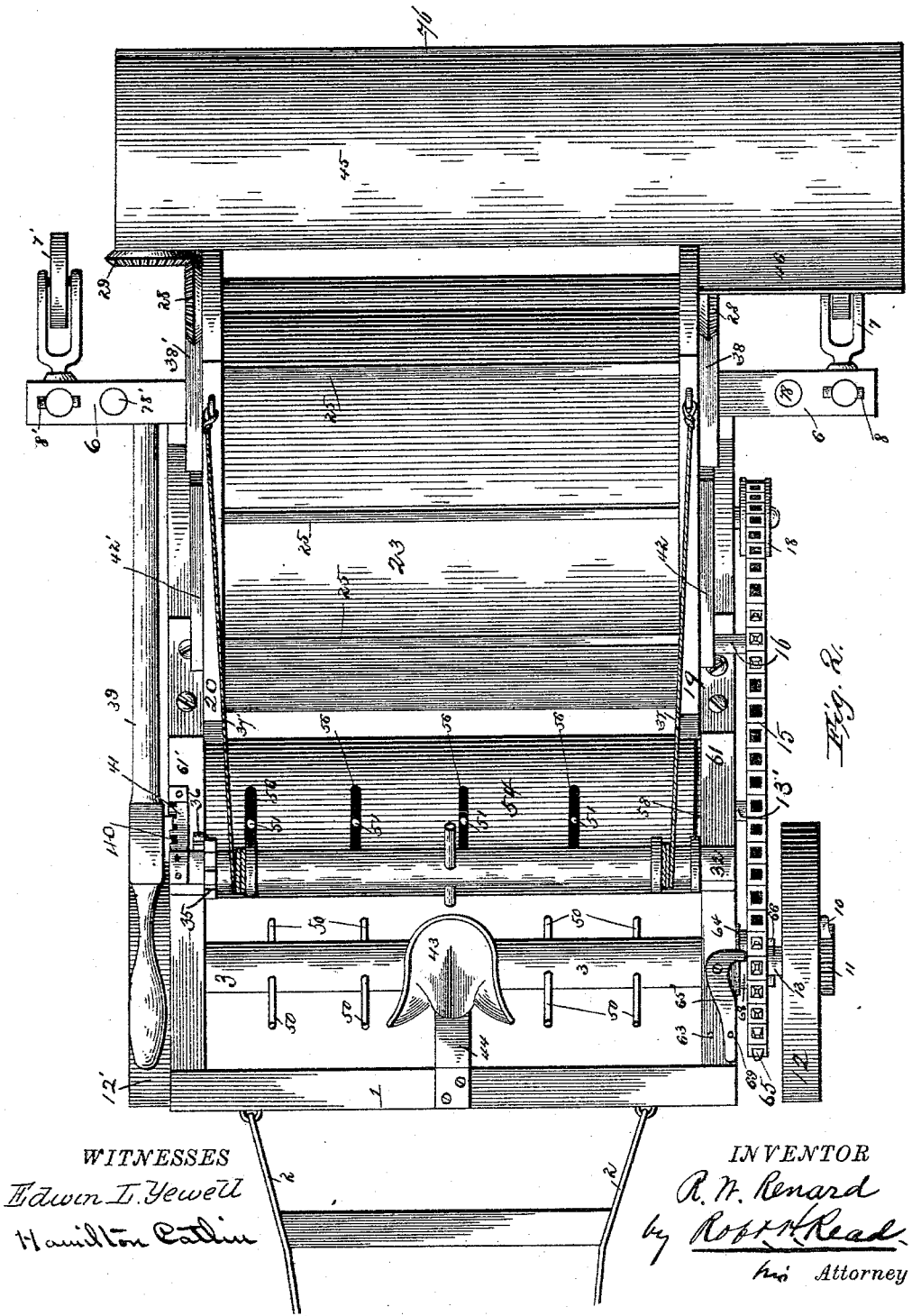
Figure 3:
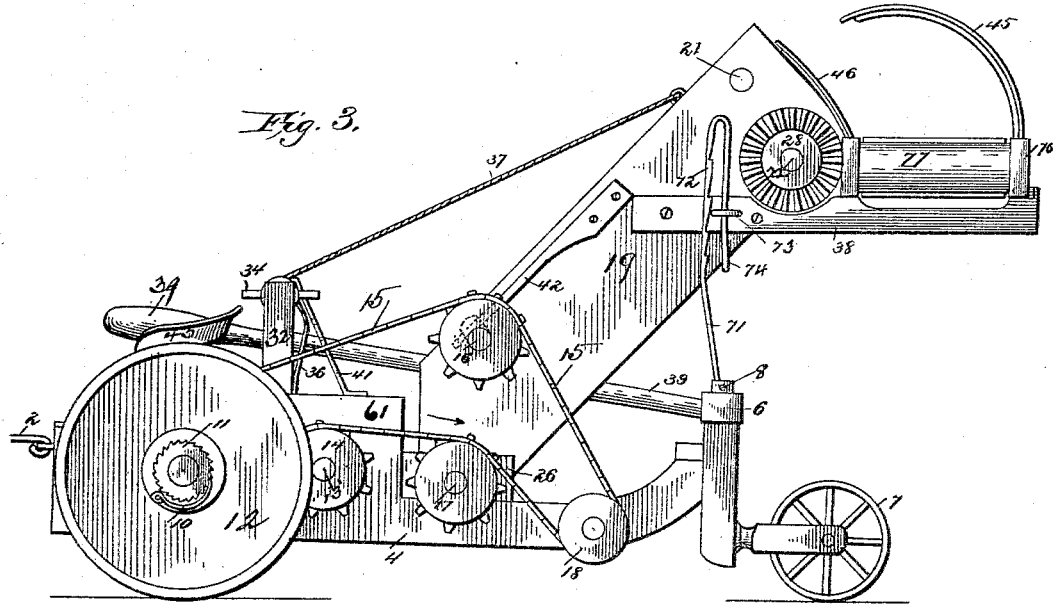
Figure 4:
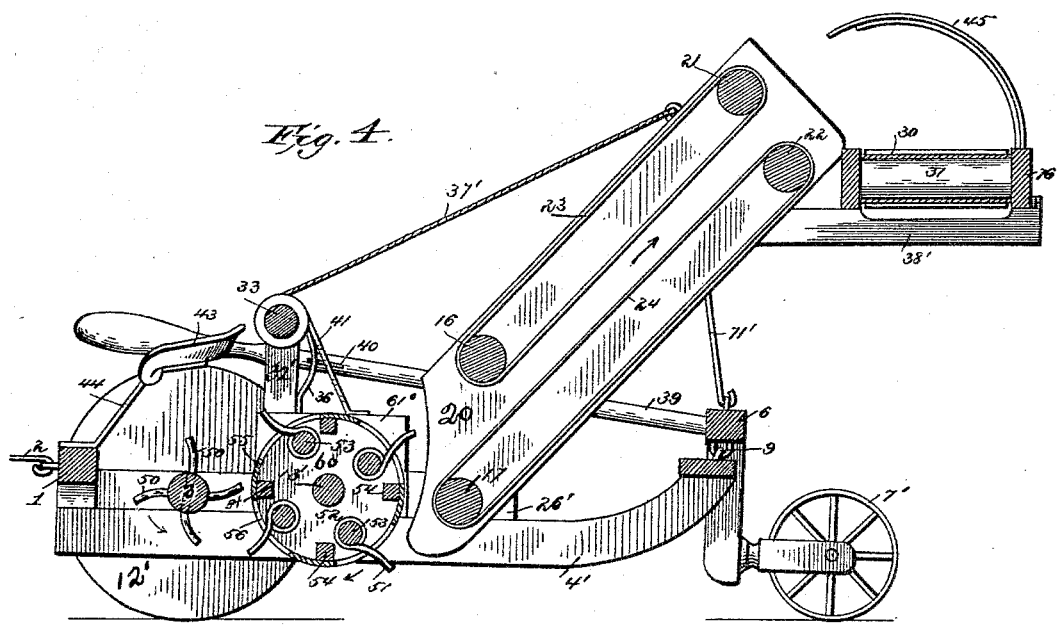

In the accompanying drawings, which illustrate my invention, Figure 1 is a perspective view of the combined raking and loading apparatus, the side-delivery guard being removed. Fig. 2 is a plan view of the same. Fig. 3 is a side elevation on the right side of Fig. 1. Fig. 4 is a longitudinal section of Fig. 3, part being shown in elevation. Fig. 5 is a bottom view of the side-delivery conveyer. Fig. 6 is a top view of the same. Fig. 7 is a detail view showing the clutch for throwing the machine into active relation to the traction-wheels. Fig. 8 is an end view of the drum on which the rakes are mounted, showing in section the guides which control their folding movement.

The machine may be readily operated by a single horse. A single pair of shafts 2 are therefore shown in the drawings. These are preferably hung upon the draft-bar 1. A frame 4, on which this draft-bar is mounted, has trunnioned in its forward end a shaft 3, on which the traction-wheels 12 12' are placed, one of these 12 being free to rotate upon it when the machine is moving backward, but by means of pawl and ratchet 10 11 rotating the shaft when the machine is moving forward, the other wheel 12' being loosely mounted on shaft 3. On the shaft 3 are removably secured a series of short rake-teeth 50, two rows at right angles being shown, which may be conveniently held frictionally in holes drilled through the shaft, as shown in dotted lines in Fig. 4, or otherwise detachably secured. This shaft when the teeth are inserted constitutes a rotatable supplemental rake. As these rake-teeth are only intended for use on heavy windrows, as where the hay may have been previously raked, their use is not always necessary.

On a prolongation 13 of the shaft 3 is a sprocket-wheel 65, which may be made fast or loose on the shaft by mechanism presently to be described. A sprocket-chain 15 communicates motion from the shaft 3 and its co-operating sprocket-wheel to shafts 13' 16 17, a tension-pulley 18, mounted on the frame, guiding the chain. The frame 4 is pivotally hung at 9 on each side of the machine to a support 6 for the casters 7 7', the casters being swiveled, as shown, in the support and held in place by pins 8 8', so as to have lateral play and permit the machine to be readily turned to avoid any obstacle which may be in its path. These casters are set wide apart, so as to hold the machine in stable equilibrium when loading. Supplemental bearings 78 78' are provided in the support 6, so that the casters can be moved closer together when the loading machinery is removed and made to align with the traction-wheels, so that when tedding alone these casters will follow in the tracks of the forward wheels.

The frame 19 20 of the loading machinery is pivotally hung on the shaft 17. In this frame are trunnioned four spindles 16, 17, 21, and 22, which carry endless belts or aprons 23 and 24, cross laths or strips 25 being secured on said aprons to give good frictional contact with the hay or other material to be elevated. The spindle 17, on which the elevator-frame 19 20 rocks when its angular elevation is changed, is journaled in blocks 26 26', which are secured to the side beams 4 4' of the main frame by bolts or screws 27. By taking out these bolts or screws the whole elevating machinery may be taken away, leaving only the raking or tedding part of the apparatus. The spindle 22 carries a bevel-gear 28 on each side of the machine, either of which may be made to co-operate with the side-delivery conveyer. The latter consists of a frame 76, in which is journaled at each end rollers or spindles 77 77′, one of these being provided with a bevel-gear 29, which engages one of the gear-wheels 28 above mentioned. An apron 30 is carried by these rollers, said apron being provided with transverse strips 31 31, like the elevator-aprons. The frame 76 is made sufficiently long to carry the hay laterally to a wagon moving along by the side of the loader. Supports 32 32′ are secured on the main frame, in which turns a windlass 33, provided with lever 34, by which it may be rotated, and a ratchet and pawl 35 36 to prevent backward movement. Cords 37 37′, secured to the windlass, connect with the upper part of the elevator-frame, as shown. By turning the windlass the elevator-frame may be elevated to any desired inclination and the side delivery adjusted to a height exactly suited to the height of the load on the wagon. Supports 38 38′, secured to the sides of the elevator-frame, are shaped to receive the side-delivery frame 76, the part of the frame which rests on the inner ends of the supports being provided with mortises, as shown at 80, Fig. 5. A lever 39 extends from the beams 6, to which it is fastened to the forward end of the machine, and carries a plate 40, adapted to be shifted into engagement with any tooth of a rack 41.

By raising the lever 39 the frame 4 of the machine is raised and by depressing said lever the frame is lowered. The rake-teeth 51 may thus be adjusted to sweep close to the ground or be raised entirely clear of the hay, whether the latter has been collected into windrows or not. Springs 42 42′ on the side bars of the elevator-frame permit the journal 16 to yield, so as to accommodate itself to different thicknesses of the layer of hay being raised and keep the aprons always in proper engagement with the hay it is lifting. A guard 45 is provided on the rear side of the frame 76, and a short guard 46 on its forward side beyond the elevating-aprons. These guards are detachable, being held in the frame by pins, as 47 48, and co-operating holes 47′ 47′ and 49 49 49, for the short and long guards, respectively. The frame 76 is provided with these holes on both top and bottom, thus making the side conveyer reversible, so that when the frame 76 is turned upside down and end for end, so as to deliver on the opposite side of the machine, the guards may be readily put in place. It will be noted that a bevel-gear 28 is provided on each end of spindle 22, so that the delivery to either side of the machine is rendered possible.

As before stated, the teeth 50 50 of the front rake are removable, and do not reach so close to the ground as the rake-teeth of the main drum or rake 54. The two sets of teeth rotate in opposite directions, as shown. It will therefore be seen that teeth 50 will co-operate with teeth 51 in raising the hay. In operating on heavy windrows this will be found very advantageous in preventing a large bunch of hay rolling or sliding off the teeth 51. The teeth 51 are made of spring metal coiled around rake-heads or spindles 53, journaled in bearings in the disk 60 at the ends of the drum, said disk being rigidly secured to shaft 13′, on which a sprocket-wheel 14 is secured. The drum is therefore given positive motion by the sprocket-chain 15. The teeth by being coiled, as shown in Fig. 4, are rendered very elastic and yield when they strike an obstruction, as a stone or root. The drum consists of longitudinal bars 54, fixed to the end disks, over which bars are fastened a cylinder of sheet metal 55, provided with a series of slots 56 for each gang or series of rake-teeth. These slots extend circumferentially, and are of sufficient length to permit the rake-teeth 51 to fold in the slots. The folding action is accomplished by the following mechanism: Each rake-spindle 53 is provided on one side with a deflector, as 57, (see Fig. 8,) having two wings conveniently formed by bending a piece of metal in substantially the shape shown. These deflectors co-operate with curved guides 58 59, secured to the side of the main frame and fixed at such distances respectively from the drum, axis, or shaft 13′ that on the up movement one wing of each deflector is engaged by the outer face of guide 58, and on the down movement the other wing is engaged by the inner face of guide 59. The guides 58 59 are shown in section in Fig. 8.

On inspection of the drawings it will be seen that the series of rake-teeth 51 hang down freely; but as the rake-spindles are carried forward in the operation of the machine their own weight and that of the hay they carry tends to hold them down; but the wing of the deflector bears against the guide 58, and the teeth are prevented from tilting until the wing reaches the end of the guide. The teeth then fold into the slots under the weight of the hay, and are kept folded by the guide 59. The several positions of the teeth are indicated at 51, 51′, 51², and 51³. The shaft 13′ is journaled in bearings 61 61′, which form part of the main frame 4.

In order to keep the rake-teeth out of action until the machine is in actual use of loading or tedding, I provide a clutch mechanism. (Shown in detail in Fig. 7.) The sprocket-wheel 65 carries a cylindrical extension 68 centrally on its inner face, flanged at 64, as shown, the flange co-operating with a clutch-lever 65′, on the handle of which is any convenient device for locking it, as a hole 70, co-operating with pins 63 69, secured to the frame 4. On the extension 13 of the shaft 3 are radial lugs 66, and the outer face of the sprocket-wheel is provided with a seat 67 for these lugs. In the position shown in the drawings, Fig. 7, the wheel 65 is free to rotate on the journal 13; but if lever 65' be shifted to pin 63 said wheel will be forced outwardly and over the lugs 66 67, in which position the wheel will be locked on shaft 3 and will rotate with it. In order to relieve the strain of the elevator upon the cords 37 37', I provide side stays 71 71' pivoted to the support 6, each having a series of notches, as at 72, to co-operate with a staple 73, through which a bent arm of the stay projects as the elevator is raised. The staple engages the walls of the notches. The arm 74 acts as a spring to hold the staple in the notches.

The driver sits upon a seat 43, fixed to a support 44 on the draft-bar.

The operation of the machine will now be understood. If it is to be used for tedding only, the stays 71 71' are removed and the screws 27 27 taken out. The elevator mechanism may then be slipped away. When the elevator-frame is removed from the machine, the drive-belt should be shortened sufficiently to take up unnecessary slack. The casters are swiveled in the supplemental holes 78 78'. When the machine is in the field, the clutch 65 is shifted and the rakes thrown into operation. The hay is picked up as the teeth sweep near the ground and carried around by the cylinder and dropped with the moist side up behind the machine.

So far as the action of the rakes is concerned the tedding operation is exactly the same as the loading. In loading, the hay is deposited on the lower apron 24 by the rake-teeth 51 in the drum, and lifted by and between the upper apron 23 and lower apron 24, and deposited on the side-delivery apron 30, by which it is carried up on the wagon. When the machine is not in operation, the lever 39 is raised, so as to hold the rake-teeth well clear of the ground. By suitably adjusting this lever the rake-teeth may be brought within different degrees of proximity to the ground.

It will be noted that in backing the machine the loading mechanism is not operated, and that the swiveling of the casters and the universal joint at 9 permit the front and rear end of the machine to move freely upon each other, so that the rakes can be brought close to hay that may lie near an obstruction, while the machine is steered around such an obstruction.

Having thus described my invention, what I claim, and desire to obtain by Letters Patent, is—

1. In a hay rake or loader, the combination of a rotatable main rake, a supplemental rake in front of the main rake, rotatable in an opposite direction and provided with teeth farther from the ground than the main-rake teeth, the teeth of the supplemental rake being removable, whereby it may be used with the teeth on heavy windrows or without the teeth on light windrows, and an adjusting-lever for varying the distance from the ground of the rakes.

2. In a hay-loader, the combination of the elevator, a horizontal side-delivery apron at the discharge end of the elevator, driven by the same source of power as the elevator, said apron being reversible to discharge to either side of the machine, a removable guard to keep the hay upon the apron, and supports for securing the guard to the outside of the apron-frame in either position of delivery.

3. The combination, of the elevator-frame, a rotating spindle at the delivery end, a gear-wheel on each end of the spindle, a side-delivery frame and supports therefor, said frame being provided with a gear-wheel at one end, and detachable guards adapted to be secured in suitable supports to either top or bottom side of the frame, whereby the frame may be turned upside down and reversed and used to deliver hay at either side of the machine, as desired.

4. The combination of a main frame carrying a rake, a cross-beam pivoted to said frame at the rear and adapted to be rocked in a vertical plane, casters supporting said beam and located out of a vertical plane cutting the same, and an adjusting-lever secured to the beam and extending to the front of the machine, whereby when the lever is operated the beam will raise or lower the rake, as and for the purpose set forth.

5. In a hay-loader, the combination, with the elevator, of a stay 71, provided with arm 74, forming a hooked end on the stay, notches 72, and a catch 73, secured to the elevator-frame, co-operating with the stay, said catch encircling the stay and adapted to engage the notches.

In testimony whereof I affix my signature in presence of two witnesses.

RUDOLPH W. RENARD.

Witnesses:
 M. C. EBERLY,
 E. W. RUPP.